Patented Dec. 8, 1925.

1,564,202

UNITED STATES PATENT OFFICE.

JENS HERMAN CHRISTENSEN, OF HOLTE, DENMARK.

METHOD OF PRODUCING WATER-INSOLUBLE MULTICOLORED SCREENS.

No Drawing. Application filed May 20, 1924. Serial No. 714,553.

*To all whom it may concern:*

Be it known that I, JENS HERMAN CHRISTENSEN, a subject of the King of Denmark, residing at Holte, Denmark, have invented a new and useful Improvement in Methods of Producing Water-Insoluble Multicolored Screens; and I do hereby declare the following to be a full, clear, and exact description of the same.

It is known to produce multicolored screens by applying colored particles which have been emulsified in a liquid, on a carrier, the emulsifying having been effected by pressing a colored liquid into another liquid in which the former liquid is completely or almost completely insoluble, or by shaking the two liquids together. Further according to this method insoluble multicolored screens have been produced by dissolving compounds of basic dyes and tannic acid in alcohols, or of basic dyes and tungstic acid, molybdic acid or phosphotungstic acid in ammonia, producing an emulsion in well known manner, and applying the fine colored particles on a carrier. According to the last named method the emulsifying has always been effected in resin solutions and this method requires an alkaline adhering surface which has been produced for instance of gelatine and borax or sodium silicate or a basic derivative of cellulose.

It has now been found that through an appropriate choice of the emulsifying means colored particles can be produced which also strongly adhere to surfaces which do not possess a special reacting power, for instance glass, celluloid, cellulose acetate, hardened gelatine or the like, whereby the producing of the screens is materially simplified. Such particles are produced if a colored water or water and alcohol containing solution is emulsified into a solution of pure rubber, with an addition of a suitable resin, in benzene, toluene or the like. In these emulsifying liquids the resin, for instance gum dammar, has only the effect that the particles become more stable so that they do not flow together after the emulsifying. The rubber, however, which can also wholly or partly, be substituted by guttapercha, balata or another substance of a chemically neutral character, attributes to the emulsifying liquid the necessary viscosity. The addition of a resin to the rubber is thus not altogether indispensable. The producing of the screen in itself remains the same as that commonly used in making emulsion screens but the carrier, ordinarily glass or a film, need not be provided with a special reacting coating. The particles adhere to the neutral carrier which is placed in or drawn through the liquid in which the colored particles are suspended, while particles not in contact with the carrier fall off or are rinsed away.

Example: 1 liter of each of the dye solutions are emulsified per se in about three times as much of a thick pure rubber solution or in a solution in which the rubber has been partly substituted by resin, for instance gum dammar. As the produced colored emulsions are too thick for being applied on the carrier, the rubber is removed through washing by solvents such as benzene, gasoline, carbontetrachloride, etc. The three separate kinds of colored particles are thereafter mixed in the correct proportion and applied to the carrier.

It has been common in the first of the above named known methods to add rubber solution to the finished emulsified particles, but only after the first emulsifying has been effected by gum dammar and only with the object of preventing the colored particles from flowing together when applied to the carrier. Furthermore in this known method only a quite thin solution of rubber is used. The above described novel method could not be carried out, and its new effect, could not be foreseen from a knowledge of these statements.

Having thus fully described my invention I claim as new and desire to secure by Letters Patent:

Method of producing multicolored screens, consisting in dissolving basic dyes and mordants for the said dyes in a suitable solvent, emulsifying the solutions in separate portions of a substantially neutral viscous emulsifying medium, removing the major part of the emulsifying medium through diluting with a suitable solvent for the same and decanting, causing a mixture of the differently colored particles to adhere to a neutral carrier, removing the surplus of the particles, and drying the said carrier with the adhering particles.

In testimony whereof I have affixed my signature.

JENS HERMAN CHRISTENSEN.